US012314910B2

(12) United States Patent
Chakraborty et al.

(10) Patent No.: US 12,314,910 B2
(45) Date of Patent: May 27, 2025

(54) ARTIFICIAL INTELLIGENCE FOR MEETING MANAGEMENT

(71) Applicant: INTERNATIONAL BUSINESS MACHINES CORPORATION, Armonk, NY (US)

(72) Inventors: Aditi Chakraborty, Plano, TX (US); Saraswathi Sailaja Perumalla, Visakhapatnam (IN); Rachana Vishwanathula, Hyderabad (IN); Sweta Agarwal, Birpara (IN)

(73) Assignee: International Business Machines Corporation, Armonk, NY (US)

( * ) Notice: Subject to any disclaimer, the term of this patent is extended or adjusted under 35 U.S.C. 154(b) by 322 days.

(21) Appl. No.: 18/060,066

(22) Filed: Nov. 30, 2022

(65) Prior Publication Data

US 2024/0177118 A1 May 30, 2024

(51) Int. Cl.
*G06Q 10/10* (2023.01)
*G06F 40/20* (2020.01)
*G06Q 10/1093* (2023.01)

(52) U.S. Cl.
CPC ......... *G06Q 10/1095* (2013.01); *G06F 40/20* (2020.01)

(58) Field of Classification Search
CPC ..................................................... G06Q 10/10
USPC ....................................................... 705/7.19
See application file for complete search history.

(56) References Cited

U.S. PATENT DOCUMENTS

| 9,282,289 | B2 | 3/2016 | Alexandrov |
| 9,699,271 | B2 | 7/2017 | Brander |
| 11,006,077 | B1 | 5/2021 | Truong |
| 11,265,183 | B1 * | 3/2022 | Lyer .................... H04L 12/1831 |
| 11,516,036 | B1 * | 11/2022 | Harathi ............... H04L 12/1827 |
| 2012/0323933 | A1 | 12/2012 | He |
| 2018/0077099 | A1 * | 3/2018 | Silva ....................... H04L 51/04 |
| 2020/0410453 | A1 * | 12/2020 | Nalliah ................... G06F 16/93 |
| 2021/0141933 | A1 | 5/2021 | Kochura |
| 2022/0368745 | A1 * | 11/2022 | Rajendran ............... H04L 65/75 |
| 2023/0004713 | A1 * | 1/2023 | Broussard ............ G06F 40/274 |

OTHER PUBLICATIONS

John Mese et al., "Method to filter notifications," IP.com Prior Art Database Technical Disclosure, IP.com No. IPCOM000235473D, Mar. 3, 2014, 2 pgs.
Disclosed Anonymously, "Suppression of Inconvenient Notifications," IP.com Prior Art Database Technical Disclosure, IP.com No. IPCOM000259215D, Jul. 19, 2019, 5 pgs.
Disclosed Anonymously, "System and Method for Smart Screen Sharing at Online Meetings," IP.com Prior Art Database Technical Disclosure, IP.com No. IPCOM000265546D, Apr. 23, 2021, 4 pgs.

(Continued)

*Primary Examiner* — Nga B Nguyen
(74) *Attorney, Agent, or Firm* — Caleb D. Wilkes

(57) ABSTRACT

A method, computer system, and a computer program product for automated management of a meeting are provided. A first computer may receive a meeting agenda for a first meeting. The first computer may access live content from the first meeting. The first computer may generate a meeting suggestion based on the meeting agenda and on the accessed live content. The first computer may transmit the meeting suggestion to a second computer.

20 Claims, 3 Drawing Sheets

(56) References Cited

OTHER PUBLICATIONS

Sheth, "Google Chrome will now automatically hide content of web notification while screen-sharing," thehindubusinessline.com, Jan. 26, 2021, 6 pgs., Retrieved from the Internet: <https://www.thehindubusinessline.com/info-tech/google-chrome-will-now-automatically-hide-content-of-web-notification-while-screen-sharing/article33664916.ece>.
IBM, List of IBM Patents or Patent Applications Treated as Related, Appendix P, dated Dec. 5, 2022, 2 pages.
Pending U.S. Appl. No. 18/066,064, filed Nov. 30, 2022, entitled, "Artificial Intelligence for Communication Mode Suggestion", 44 pages.

\* cited by examiner

ARTIFICIAL INTELLIGENCE FOR MEETING MANAGEMENT

BACKGROUND

The present invention relates generally to using artificial intelligence and computing programs to facilitate management of meetings, e.g., virtual meetings that occur with one or more parties joining via technology such as video conferencing.

Technology has been implemented to allow parties at remote locations to hold virtual meetings which may include communication, discussion, planning, and decision-making with participants of the virtual meeting. A basic virtual meeting, however, lacks artificial intelligence enhancement of meeting flows, execution of a meeting plan, planning for meetings, and preparing for meetings.

SUMMARY

According to one exemplary embodiment, a method for automated management of a meeting is provided. A method, computer system, and a computer program product for automated management of a meeting are provided. A first computer may receive a meeting agenda for a first meeting. The first computer may access live content from the first meeting. The first computer may generate a meeting suggestion based on the meeting agenda and on the accessed live content. The first computer may transmit the meeting suggestion to a second computer. A computer system and a computer program product corresponding to the above method are also provided.

With these embodiments, computing power may be harnessed to enhance meeting flows, execution of a meeting plan, planning for meetings, and/or preparing for meetings.

The generating of the meeting suggestion may in some embodiments include inputting the meeting agenda and the accessed live content into a first machine learning model. In response to the inputting, the first machine learning model outputs the meeting suggestion.

With these further embodiments, artificial intelligence may be harnessed to enhance meeting flows, execution of a meeting plan, planning for meetings, and/or preparing for meetings.

In some embodiments, the meeting suggestion is transmitted to a party who missed a part of the first meeting, and the meeting suggestion provides a summary of the missed part. An avatar may be generated and transmitted to the second computer along with the meeting suggestion. The avatar and the meeting suggestion may be transmitted in a manner such that the avatar presents the meeting suggestion on a display of the second computer.

With these further embodiments, artificial intelligence may be used to provide hand-holding guidance to a late-arriving party and help bring the late-arriving party up to speed for participating in a meeting such as a virtual meeting.

In some additional embodiments, the accessed live content is analyzed to determine meeting participation in the first meeting. The meeting suggestion may include a meeting participation standard based on the determined meeting participation. The meeting participation standard may include a response frequency of meeting participants of the first meeting. The meeting participation standard may include a recommended response frequency for the late-arriving party.

With these further embodiments, artificial intelligence may be used to provide hand-holding guidance to a late-arriving party and help them know what level of participation is to be expected for them in the virtual meeting.

In some embodiments, the meeting suggestion relates to a second meeting that is subsequent to the first meeting. The meeting suggestion may include a missed agenda point that was not discussed in the first meeting. The missed agenda point may be transmitted to the second computer in response to a similarity score of the second meeting with respect to the first meeting exceeding a pre-determined threshold. The meeting suggestion may include one or more preparation tasks to perform in advance of the second meeting. A timing of the transmission of the one or more preparation tasks to the second computer may be based on an estimated time amount needed to complete the one or more preparation tasks. A timing of the transmission of the one or more preparation tasks to the second computer may be based on a user profile setting.

With these further embodiments, artificial intelligence may be harnessed to enhance planning for and/or preparing for meetings so that multiple meetings may flow together more seamlessly and so that the meeting may be used to hold a team accountable for assignments.

In some embodiments, the meeting suggestion may relate to an action item that as established in the first meeting. The meeting suggestion may include a missed agenda point that has not yet been discussed in the first meeting. The meeting suggestion may be transmitted before an end of the first meeting.

With these further embodiments, artificial intelligence may be harnessed to enhance meeting flows and execution of a meeting plan.

In some embodiments, the first computer may perform an automatic retrieval of digital content. The digital content may be selected based on the meeting agenda and on the accessed live content. The generating may include the first computer performing natural language processing on at least one of the meeting agenda and the accessed live content in order to generate the meeting suggestion.

With these further embodiments, artificial intelligence may be harnessed to enhance meeting flows and execution of a meeting plan.

BRIEF DESCRIPTION OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
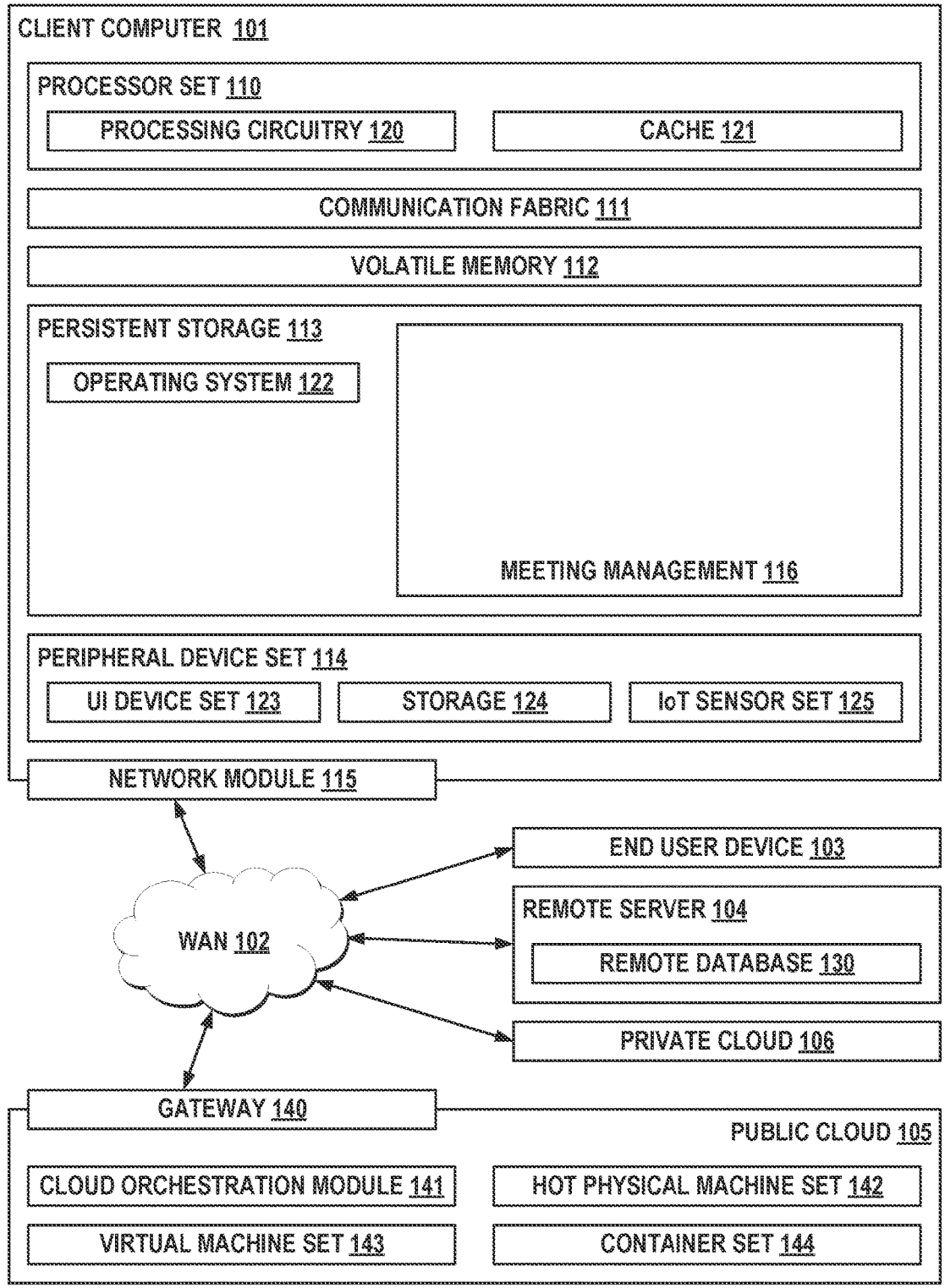
FIG. 1 illustrates a computing environment in which meeting management according to at least one embodiment may be implemented.

Detailed embodiments of the claimed structures and methods are disclosed herein; however, it can be understood that the disclosed embodiments are merely illustrative of the claimed structures and methods that may be embodied in various forms. This invention may be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The following described exemplary embodiments provide a method, computer system, and computer program product for automated management of a meeting. Meetings with multiple parties that involve important subject matter may generated detailed discussions which can have a variety of tangential aspects that can interfere with completing a planned meeting agenda. It would be helpful to implement artificial intelligence to in an automated manner to analyze the progress of a meeting and provide one or more meeting participants with helpful suggestions for keeping the meeting on track. In this manner, the present embodiments may use technology to enhance the execution of meetings, the planning of meetings, and/or preparation for future meetings. These embodiments thus build on the software library for virtual meetings.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods such as meeting management 116. In addition to meeting management 116, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and meeting management 116, as identified above), peripheral device set 114 (including user interface (UI) device set 123, storage 124, and Internet of Things (IoT) sensor set 125), and network module 115. Remote server 104 includes remote database 130). Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in meeting management 116 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in meeting management 116 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 012 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way. EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

It should be appreciated that FIG. 1 provides illustrations of some implementations and does not imply any limitations with regard to the environments in which the meeting management may be implemented. Many modifications to the depicted environments and structures may be made based on design and implementation requirements.

Figure 2:
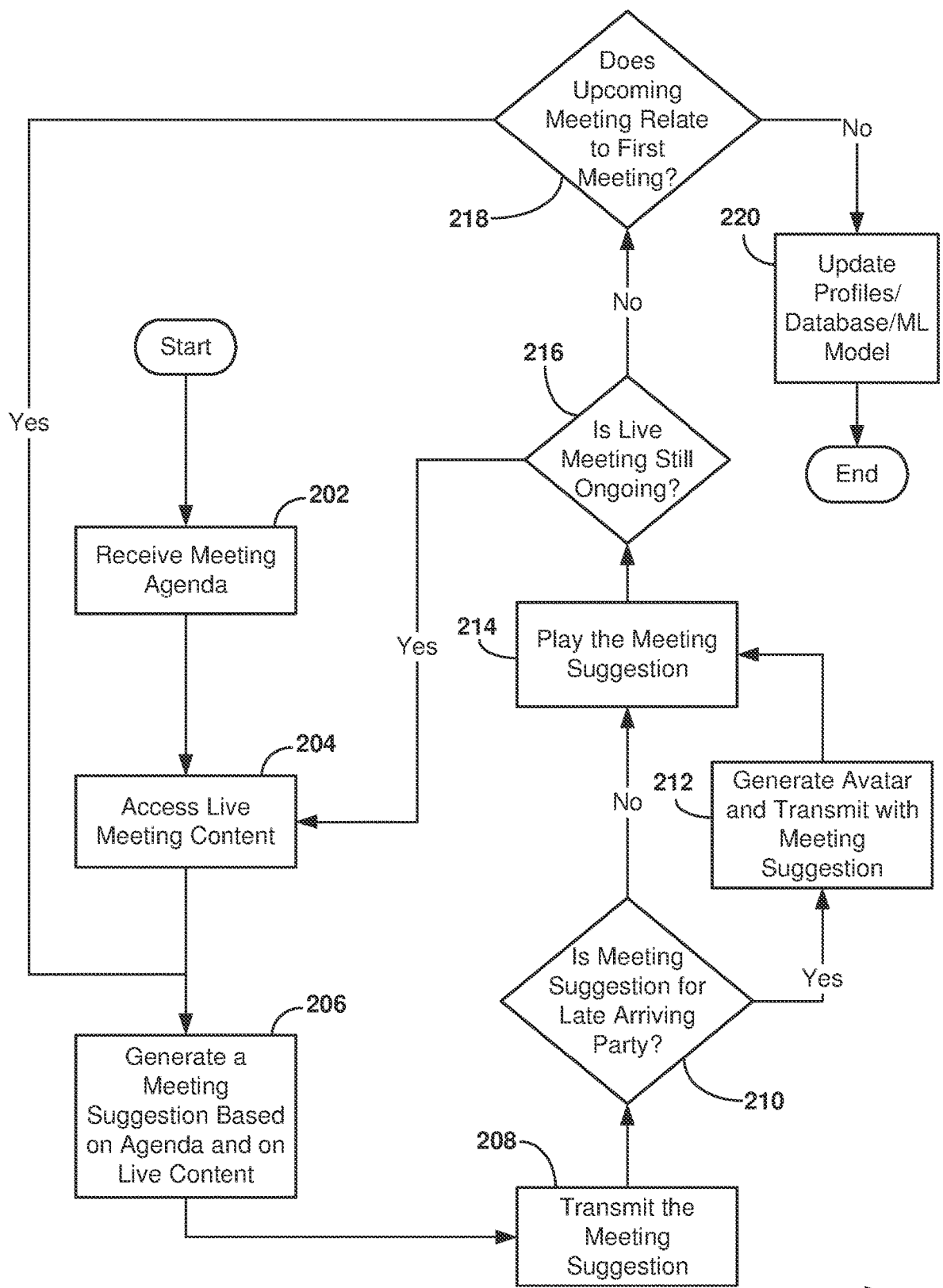
FIG. 2 is an operational flowchart illustrating a meeting management process according to at least one embodiment.

Referring now to FIG. 2, an operational flowchart depicts a meeting management process 200, according to at least one embodiment, performed within the computing environment 100 and/or using aspects of the computing environment 100 such as the meeting management 116. The meeting management process 200 may include and/or generate various modules, user interfaces, and services, and may use data storage and may implement the meeting management software 116 to perform the meeting management process 200.

In a step 202 of the meeting management process 200, a meeting agenda is received. In various embodiments, the meeting agenda is in the form of an electronic document that may include one or more meeting topics, timing plans, and role information such as listing one or more presenters. This meeting agenda may be uploaded to the meeting management program 116 by a user such as a user of the computer 101. Alternatively, the meeting agenda may be uploaded by a user at a different computer such as end-user device 103. The agenda may be transmitted from one computer to another computer via the WAN 102. The agenda may be submitted to an instance of the meeting management program 116 on a remote server 104. This usage on the remote server 104 may be implemented to host a central copy of the meeting agenda that may be accessed and/or updated by future meeting participants who are currently positioned remote from each other. A second user may access and read the meeting agenda stored on the remote server 104 and make updates to the stored meeting agenda. The updates are available to all other users who have been given access to the stored meeting agenda on the remote server 104. A user using the computer 101 may transmit a digital copy of the meeting agenda via the WAN 102 to the remote server 104. In some embodiments, the meeting management program 116 may generate the meeting agenda based on information received in capturing audio from the meeting as the meeting begins and progresses. Natural language processing may be performed on that recorded audio in order to produce the meeting agenda. For example, the natural language processing may identify one or more meeting topics, timing plans, and role information and insert this information into an electronic document that forms the meeting agenda.

In a step 204 of the meeting management process 200, live meeting content is accessed. This live meeting content is generated from the same meeting for which the meeting agenda was received in step 202. The content may include a real-time audio recording from words that are spoken during the meeting. A microphone such as part of the UI device set 123 of the computer 101 may record audio from the live meeting. The content may include visual content such as images and/or videos displayed in screen sharing between multiple computers or on video analysis of a video displayed on an accessible remotely-ran website. Optical character recognition may be performed on such captured images to obtain text data from the shared images. The content may include other text data such as message exchanges displayed on virtual meeting software such as in a public or private message portal and/or in an interactive poll. In an alternative embodiments, image and/or video recognition may be used to interpret and understand the images and/or video being displayed in real-time to, for example, understand that a "cat" is walking in front of the display screen. Artificial intelligence may subsequently be applied to the captured images and/or video to interpret pictures and/or videos.

In a step 206 of the meeting management process 200, a meeting suggestion is generated based on the meeting agenda that was received in step 202 and based on the live content that was received in step 204. In some embodiments, the generating the meeting suggestion includes inputting the meeting agenda and the accessed live content into a first machine learning model. In response to the inputting, the first machine learning model outputs the meeting suggestion.

Meeting suggestions may include meeting agenda points that were missed or have not yet been covered, whereby the suggestion is a reminder to cover the agenda point in the current meeting or in an upcoming similar meeting. Meeting suggestions may include a summary of missed meeting content for a party who joins the meeting late. The meeting suggestion may include a recommended interaction frequency for a meeting participant. For example, the recommended interaction frequency may suggest that the user comment and/or ask a question once in a specified time interval, e.g., within five minutes. The meeting suggestion may include a preparation task to perform in preparation for an upcoming subsequent meeting. The meeting suggestion may include an action item that was established in the meeting, whereby the presentation of the action item serves as a reminder to the recipient to perform and/or follow up with the action item. The meeting suggestion may include a timing suggestion such as a projection of going overtime. This timing suggestion may include a suggestion to solve a time crunch, e.g., for example by skipping one or more portions of the meeting agenda, speeding up some portion of the meeting, and/or making arrangements to prepare if the meeting goes overtime. Such arrangements may include suggestions to notify others who are scheduled for a following event/conversation, suggestions to extend video conferencing time, suggestions to take medicine at a scheduled time, etc.

For embodiments in which a meeting suggestion includes a summary of missed meeting content, the summary may be generated in the form of text data, audio data, and/or other visual data such as an avatar. Embodiments with an avatar are explained below with respect to step 212. The text data may in some embodiments be generated in the form an electronic document. The meeting management program 116 may, as part of the accessing of the live content of the meeting, record audio and/or displayed images for the meeting, perform speech-to-text transcription of recorded audio, and perform natural language processing on the produced text from the meeting. The meeting management program 116 may compare the meeting text with the meeting agenda and may generate an electronic document with meeting comments presented under agenda points taken from the meeting agenda.

In some embodiments, the meeting summary may be generated along with an audio file and/or video file which includes the accessed live meeting content. The audio and/or video file may be attached to an electronic document of the meeting summary. In some embodiments, the electronic document may generate time links for the beginning of an agenda point and present these time links adjacent to or near the listing of an agenda point on the electronic meeting summary. When the electronic meeting summary is presented to a user, clicking on the time link may cause the video file and/or audio file to jump to that portion of the recording in which that agenda point was discussed. This jumping may include an automatic rewind of the recording to the specific portion in the recording where that point was discussed and/or where the discussion of that agenda point and/or summary point began.

Any machine learning model used for step 206 or other step of the meeting management process 200 may include naive Bayes models, random decision tree models, linear statistical query models, logistic regression n models, neural network models, e.g. convolutional neural networks, multi-layer perceptrons, residual networks, long short-term memory architectures, algorithms, deep learning models, and other models. The one or more machine learning models may be trained. The process of training a machine learning model may include providing training data (such as past meeting agendas and past meeting recorded content) to a learning algorithm or to a machine learning algorithm. The training data may be labeled by a domain expert, or unlabeled in the case of unsupervised machine learning. The machine learning model is the model structure or system that is created by the training process. The training data, in various embodiments, should include targets or target attributes which include a correct answer. The learning algorithm finds patterns in the training data in order to map the input data attributes to the target. The machine learning model is trained upon these patterns so that the answer can be predicted for similar future inputs. A machine learning model may be used to obtain predictions on new data for which the target is unknown. The machine learning model uses the patterns that are identified to determine what the target is for new data without a given answer. Training may include aspects of supervised learning (particularly in the case of labeled training data) and/or unsupervised learning (in the case of partially labeled and/or unlabeled training data). The targets as part of supervised learning may be meeting suggestions that correspond to a particular set of meeting data including an agenda and the live meeting content.

Various platforms exist to allow a machine learning model to be created or trained. The training may include selecting data types, uploading data, selecting class types, and allowing a system (commercial or otherwise) to then train the data. Such data upload may occur at the computer 101 or at another computer associated with the remote server 104.

In a step 208 of the meeting management process 200, the meeting suggestion is transmitted. The transmission may occur from a computer such as computer 101 which hosts the program 116 or hosts an instance of the program 116. This transmission may occur within a computer and/or via one of the networks such as the WAN 102 shown in FIG. 1 so that the meeting suggestion travels from one computer to another computer. In some instances, the meeting suggestion is transmitted via the WAN 102 from the remote server 104 (which holds an instance of the meeting management program 116) to an end user device 103 (which holds another instance of the meeting management program 116). This transmission may be in the form an email message sent to an email program on the end user device 103. This transmission may be in the form of a link that is transmitted as part of virtual meeting software program on which the virtual meeting is taking place.

In a step 210 of the meeting management process 200, a determination is made whether the meeting suggestion is for a party that is arriving late to the meeting. Time may be accessed from any computer that is available to the meeting management program 116. Specifically, time may be accessed via a system clock of an available computer. If the determination of step 210 is affirmative that the meeting suggestion is for a party that is arriving late to the meeting, the meeting management process 200 proceeds to step 212. If the determination of step 210 is negative and the meeting suggestion is not for a party that is arriving late to the meeting, the meeting management process 200 may proceed to step 214 and skip step 212. The meeting management program 116 may track meeting participants and the arrival time of the meeting participants. The meeting management program 116 may recognize an arrival time that is after a meeting start time as being a late-arriving participant. The meeting management program 116 may also track a meeting start time based on a scheduled meeting start time and/or on a beginning of an exchange of information within the meeting software, such as the beginning of talking and/or the provision of images such as in a video and/or slide.

In a step 212 of the meeting management process 200, an avatar is generated and transmitted with the meeting suggestion. The meeting suggestion may be a summary of content already covered within the meeting up-to-this time. The suggestion and avatar may be transmitted in a manner so that the avatar is depicted on the display screen of the receiving computer as speaking the meeting suggestion. Specifically, the meeting summary may be presented in the form of played audio that is played to correspond to a visual image of the avatar opening its mouth for speaking. Additionally and/or alternatively, the meeting summary may be presented in the form of displayed text that appears in a text bubble that is displayed on a computer display screen as a visual image emerging from the visual image of the mouth of the avatar. The meeting suggestion may in various embodiments include the summary of meeting contents up to the time when the late arriving party joined the meeting. In some embodiments, an avatar is selected from various possible avatars based on meeting agenda points and the accessed live content of the meeting. The avatar may be generated with a theme that matches one or more meeting points. The avatar may be generated to have a persona that copies a real-life persona of a presenter of the meeting. For example, the meeting management program 116 may access video content of the live meeting to identify one or more images of a presenter of the meeting. The avatar may be generated by the meeting management program 116 to have a cartoon form that mimics the captured one or more images of the presenter. An image file and/or video file containing the generated avatar may be transmitted along with meeting summary content to the user computer.

In some embodiments the accessed live content of the live meeting is analyzed by the meeting management program 116 to determine meeting participation in the first meeting. This meeting participation may indicate the amount of how much various participants have participated in the meeting by sharing information, e.g., by speaking or typing. The meeting suggestion may include a meeting participation standard based on the determined meeting participation. In some instances, the standard for a participant may be to listen and learn so that no comments or questions are required and/or expected. In other embodiments for which all meeting participants have made at least one comment or question, the suggestion may be for the late arriver to make at least one comment and/or ask at least one question over a specified time interval, e.g., every ten minutes. The recommended time interval may be based on the determined frequency with which other participants have participated in the current meeting up to the present time. In some embodiments, historical information about meeting participant participation (such as from past meetings for the same team or organization) may be accessed and relied on for determining the frequency recommendation. Thus, in some embodiments the meeting participation includes a response frequency of meeting participants of the first meeting, and the meeting participation standard includes a recommended response frequency for the late-arriving party.

In a step 214 of the meeting management process 200, the meeting suggestion is played. This playing of the suggestion may occur visually via display of text on a display screen of a computer of the suggestion recipient who is a meeting participant. The computer may be the computer 101 and the display screen may be part of the UI device set 123. The playing may additionally and/or alternatively occur in an audible manner via playing over a microphone of the UI device set 123. The receiver computer may alternatively be an end user device 103.

In a step 216 of the meeting management process 200, a determination is made whether the live meeting is still ongoing. If the determination of step 216 is affirmative that the live meeting is still ongoing, the meeting management process 200 returns to step 204 for a repeat of steps 206, 208, 210, 214, and possibly 212. Thus, some steps of the meeting management process 200 may be repeated so that multiple suggestions are generated via the artificial intelligence throughout a single meeting. Additional suggestions may be generated based on other live content received throughout the duration of the live meeting. If the determination of step 216 is negative and the live meeting is not still ongoing, the meeting management process 200 proceeds to step 218. The meeting management program 116 may check for exchange of any audio and/or visual information via the meeting software and/or at the meeting location such as a physical location and/or via virtual meeting software for a virtual meeting in order to determine whether the meeting continues. To make the determination of step 216, the meeting management program 116 may check for whether a meeting session of the live meeting is alive on the computer(s) of the meeting participants.

In a step 218 of the meeting management process 200, a determination is made whether an upcoming meeting relates to the first meeting. The first meeting refers to the meeting for which live content was received in step 204. If the determination of step 218 is affirmative that an upcoming meeting relates to the first meeting, the meeting management process 200 returns to step 206 for a repeat of steps 206, 208, and 214 for the upcoming meeting. Thus, if one agenda point is missed at a first meeting the meeting management program 116 may present this agenda point for discussion at a subsequent meeting. If the determination of step 218 is negative and no upcoming meeting relates to the first meeting, the meeting management process 200 proceeds to step 220. A similarity score based on overlap of meeting participants and based on similarity such as semantic similarity for meeting agenda content of the various meetings may be generated and compared to a pre-determined threshold in order to perform step 218.

In some embodiments, for the looped cycle repeat of steps 206, 208, 214 the meeting suggestion may include one or more preparation tasks to perform in advance of the second meeting which may be related to the first meeting. The user may have received an assignment in an earlier meeting to prepare an aspect of a subsequent meeting. The meeting suggestion in that manner may encompass a preparation reminder to the meeting participant to perform the assigned task to be ready for the subsequent meeting. A timing of the transmission of the one or more preparation tasks to the second computer may be based on an estimated time amount needed to complete the one or more preparation tasks. For example, for a task which can be completed in a shorter time period the advance notice given by the reminder may be reduced compared to the advance notice given by the reminder for a task which takes a long time to fulfill. For a short task, the meeting suggestion reminder may in some embodiments be given an hour or less before a scheduled start of the subsequent related meeting. For a longer task, the meeting suggestion reminder may in some embodiments be given at least one business day before a scheduled start of the subsequent related meeting. A timing of the transmission of the one or more preparation tasks to the second computer may be based on a user profile setting which the user has set according to personal preferences, such as receiving a meeting preparation reminder one hour before an upcoming meeting. The meeting suggestion may relate to an action item that was established in the first meeting.

In a step 220 of the meeting management process 200, user profiles, a database, and/or a machine learning model are updated. The information used for the updates is gathered from the earlier steps of the meeting management process 200. This information may be based on user feedback received from the one or more suggestions given earlier in the meeting management process 200. For example, if an AI-determined amount of time for a meeting prep action was insufficient the meeting management program 116 may determine to, in the future, give more advance notice of a meeting suggestion for particular meeting prep.

After step 220, the process 200 may end to be repeated at a different time for a different meeting set. Artificial intelligence such as the machine learning models may be used again or newly trained for future meetings.

It may be appreciated that FIG. 2 provides an illustration of some embodiments and does not imply any limitations with regard to how different embodiments may be implemented. Many modifications to the depicted embodiment(s), e.g., to a depicted sequence of steps, may be made based on design and implementation requirements. Steps and features from the various processes may be combined into the other processes that are described in other drawings or embodiments.

In one embodiment, the program 116 generates a virtual avatar or an augmented reality object system to provide relevant information for a participant who joined few minutes late or missed few agenda discussion points, the AI enabled system will be analyzing the already discussed contents, action items, etc., and the generated virtual avatar will be providing hand holding guideline to participant to quickly adapt to the meeting flow. This information can be shown for other cross communication, message during the meeting.

The meeting management program 116 may in some embodiments analyze the conversation content and for reoccurring meetings. If any action items, e.g., "to do items", were discussed in an earlier meeting, those one or more action items will be presented as a reminder in the current meeting, for example, are displayed on the computer of the leader of the meeting or on the computer of other one or more relevant participants in the meeting, based on the substance of the action items derived in earlier meeting. In an embodiment, the meeting management program 116 tracks discussion points, based on user preferences and meeting context. The meeting management program 116 alerts relevant participants about data that needs to be gathered or prepared for next meeting. Reminder options are based on preferences of the participants. For example, a participant may have a preference to receive a meeting preparation reminder one day before or one hour before the start of the next related scheduled meeting. The advance notice given may be based on efforts required to accomplish the task or on parties involved in providing the details. In an embodiment, before meeting is ending the meeting management program 116 displays information to the meeting host or to relevant participants for any agenda items that were not discussed or any carry-forward action items from an earlier meeting that need to be discussed.

If a meeting participant forgets to discuss something in the agenda in a meeting and the meeting is part of a series of recurring similar meetings, the meeting management program 116 may in some embodiments notify the user about the missed points in the consecutive meeting.

Because the context is understood by the meeting management program 116, if some points are targeted for a recurring meeting and are missed in the consecutive meeting, the program 116 recommends notifications regarding the missed topic.

If a participant question and/or comment is not addressed during the meeting, in some embodiments the recording of the live content via the meeting management program 116 may capture the question and/or comment and present it to a meeting leader before the end of the meeting or after the meeting so that the leader can answer/address it.

In one example for using the meeting management program 116, a manager may be using a virtual meeting to present requirements to an engineering team. While presenting the requirements, a manager may share discussion points he had with the customers. The manager says "Let me share the remaining discussion points that I had discussed in the last meeting with the customer". Without certain embodiments of the meeting management program 116, the manager would need to go over multiple applications on his personal computer such as notes, calendar, and/or instant messaging application to find out the relevant discussion points and then share those to the larger audience. With these embodiments of the meeting management program 116, however, natural language processing may be used to process the meeting contents including audio data recorded from the meeting comment made by the manager. Based on the understood request, the meeting management program 116 may search the computer applications for the relevant data. After finding the relevant data, the meeting management program 116 alerts the manager so that the manager may share the relevant notes to the larger application. This features saves time for the user and improves meeting efficiency.

In some embodiments, the meeting management program 116 may also implement some screen sharing privacy features for implementation during screen sharing that may occur in virtual meetings between two or more meeting participants. Such privacy features may be implemented with and/or may involve one or more of the following steps and/or actions:

1. A user signs up for the meeting management program 116 and receives a unique identifier to differentiate the user within the meeting management program 116 and its data storage.
2. If the user is in a meeting and has started screen sharing with their particular computer so that contents of the display screen of this first user are sent to be displayed at the screens of other users, the notifications/alerts/messages received at the computer of the first user which are not relevant to the discussion in the meeting will not be shown and be blocked, delayed, or blurred by the meeting management program 116 on the computer of the first user.
3. If the user is in a meeting and has started screen sharing, the items on the screen other than what is being presented will be masked/blurred by the meeting management program 116 after the meeting management program 116 receives content of the meeting and understands the context of meeting. The program 116 may generate and play on the computer screen an option for the user to unmask/unblur the other material, e.g., via performing a click (or equivalent action).
4. If the user is trying to reach someone (a person referred to as a "receiver") on messaging media, if the receiver is in another meeting and is sharing his or her screen, the sender is given an alert regarding the busy, occupied state of the intended receiver. If, however, the message of the sender is relevant to what is being presented by receiver, the message will be shown on the computer of the receiver after the meeting management program 116 checks user profile preferences for the user. The meeting management program 116 may perform natural language processing and optionally optical character recognition on the contents of the message in order to determine relevancy to the current meeting. The meeting management program 116 may in some embodiments perform semantic similarity with vector comparison in order to determine relevancy of the incoming message to the current meeting topics.
5. If a sender is trying to send something to receiver, the meeting management program 116 analyzes the content of the intended message. Based on this analysis, the meeting management program 116 generates a recommendation of the platform that receiver will prefer for that content. The meeting management program 116 may transmit that recommendation to the sender, e.g., as a part of the meeting management process 200.
6. If a sender is trying to send something to receiver, the content of message, the time at which the message is being sent, and the current tasks listed for the receiver on project management tools and/or on a calendar of the receiver are analyzed by the meeting management program 116. The meeting management program 116 may in response generate a recommendation of the time at which receiver is expected to take that message. This recommendation may be transmitted to the sender for playing and informing the sender.
7. If the sender has sent something to the receiver and the sender has received no response from the receiver for a time period that is larger than a predefined time limit, the meeting management program 116 may perform a cross platform search to analyze if the receiver is facing any outage/updates and upgrades for certain communication applications. If an outage for the used platform is discovered, the meeting management program 116 may determine and recommend a next best application to reach the receiver.
8. If the receiver has a busy schedule with many tasks to do and this information is input into the meeting management program 116, e.g., into the trained machine learning model, from the past patterns the machine learning model may learn that the receiver usually snoozes notifications during such situations. The meeting management program 116 may automatically snooze the notifications/alerts intended for the busy person. Meanwhile, the meeting management program 116 may also generate a response for the intended sender that indicates the current unavailability of the receiver for considering the intended message.
9. If a sender is sending a message to receiver, the meeting management program 116 may understand a mood of the receiver by analyzing various factors such as word tones and vocabulary choice of messages and/or conversations of the receiver. Based on a sour mood of the receiver, the meeting management program 116 may recommend a different wording for the message content and may send this proposal back to the sender. The meeting management program 116 may via natural language processing recognize one or more text terms associated with anger as being a sign of a bad mood for the receiver. The meeting management program 116 may evaluate a decibel level of audio recording of words spoken by the receiver. If the decibel level exceeds a predetermined threshold, the meeting management program 116 may determine that the receiver is in a bad mood. If the meeting management program 116 determines based on the analysis that the receiver is in a good mood, the meeting management program 116 may allow the original message content to be transmitted to the receiver. The meeting management program 116 may implement a machine learning model that was trained with supervised and/or unsupervised learning in order to make a mood determination of the receiver based on the input of words spoken and/or typed by the receiver. An absence of a receiver bad mood being determined by the meeting management program 116 may be interpreted by the meeting management program 116 as the receiver being in an acceptable mood to receive the incoming message.
10. If the user forgets to discuss something in the agenda in a meeting that is part of a series of recurring meetings where context of a subsequent meeting overlaps an earlier meeting, the meeting management program 116 notifies a user for or in advance of the subsequent meeting about the missed agenda point from the earlier meeting.

In one privacy-related embodiment for virtual meeting software that may include screen sharing, the meeting management program 116 may include virtual meeting software and with this software may include certain privacy features. The privacy features may include displaying additional information on the screen of a meeting participant based on the role of the participant within the meeting. In some instances, the meeting management program 116 may invoke privacy settings for a party currently performing screen sharing on their computer while removing the privacy settings for parties that are not screen sharing or are receiving the shared screen of another user. The privacy features may analyze information and on a screen-shared computer display information that is relevant to the meeting, e.g., to a current context of the meeting, but may block and/or blur irrelevant content that is irrelevant to the meeting, e.g., to a current context of the meeting. Thus, a party who is a host of the virtual meeting but is not current screen sharing may have other applications open and receive other notifications, but a meeting participant who is currently screen sharing will have other applications reduced, closed, and/or blurred and will have incoming notifications blocked if those are irrelevant to the meeting content. Thus, incoming information may be protected selectively and dynamically.

For example, if a participant A is the host of a virtual meeting and participant B is currently doing a screen share for that virtual meeting, the meeting management program 116 may allow incoming messages to participant A to continue to be displayed on the display screen of the computer of participant A based on set preference alert mechanisms for participant A. If, however, the meeting management program 116 identifies that the meeting has shifted so that participant A instead of participant B begins to screen share, the meeting management program 116 adjusts the incoming messages and notification settings for the computer of participant A so that these messages are blurred and so that notifications are repressed. If the computer that is screen sharing changes dynamically, the meeting management program applies message and notification privacy, suppression, blocking, and/or blurring rules based on alert mechanism for the current person presenting and screen sharing and other meeting participants can then continue to receive messages in regular fashion.

In some embodiments for the privacy features of virtual meeting software, the meeting management program 116 may consider (1) the context of how the user is using the computer and if the user is currently performing screen sharing in a virtual meeting and (2) a meeting agenda to determine which information on the screen to blur. For example, if a virtual meeting participant is sharing the screen and needs to search through apps on the computer to find particular content, the meeting management program 116 may compare displayed content of other open applications to determine relevancy to the current virtual meeting and may blur all apps and displayed information that are not relevant to the current virtual meeting, e.g., that are not relevant to any agenda item of the current meeting. In some instances, a graphical user interface token will be generated and displayed to give the user a chance to actuate same to override the blurring so that blurred portions or the entire contents shown on the screen display may be transmitted for screen sharing.

In at least some embodiments, the meeting management program 116 performs privacy function during screen sharing in a virtual meeting by blurring or blocking content display for the screen share transmission until explicit approval of the display is given. Thus, in some embodiments during a virtual meeting the meeting management program 116 records audio spoken as part of the virtual meeting and/or records words typed as part of the virtual meeting and searches for display authorizations. For example, software developers hold a virtual meeting together and discuss the design of a project feature. The lead of the virtual meeting is sharing the contents on his or her computer to explain the flowchart and workflow steps in a digital content slides file. During the discussion, the lead navigates on his or her computer screen to move from one screen to another to show other relevant content such as EPIC or Requirement documents. The meeting management program 116 will prevent transmission of content display of a mailbox application that is open on the screen of the virtual meeting lead. This prevention is carried out unless the lead speaks and/or types and/or actuates to give approval to the meeting management program 116 to transmit display of this mailbox application or a portion of same.

For example, while trying to find a file, the lead whose computer is performing a screen sharing transmission to the computers of other virtual meeting participants may traverse screen contents by typing 'Alt+Tab' or 'Cmd+Tab' or 'Cmd+twiddle' and certain aspects of the virtual mail inbox of the lead would, if the privacy feature of these embodiments were unavailable, be visible over the screen sharing. The privacy feature helps avoid the unintended sharing of information from one or more email messages in the mailbox application which may contain confidential information. Such confidential information may be present even in a subject line of an email. Such confidential information may relate to a potential promotion, hiring/firing decision, and/or salary hike which should not be shared with other virtual meeting participants. Such confidential information is at risk for other leadership or sales-related meetings. In these embodiments, the meeting management program 116 generates additional privacy for the screen sharing computer so that the content of applications or other information are not transmitted for screen sharing display on other computers while the screen sharing party is navigating through open relevant applications on their computer screen for that discussion.

With the above-described privacy features for screen sharing during a virtual meeting, these embodiments of the present disclosure support remote communication aspects while users are connected in a collaboration platform. These embodiments help avoid the distraction that incoming messages might cause a meeting participant if the incoming messages were not delayed and/or blocked. These embodiments use techniques of analysis by artificial intelligence on context of a meeting and presenter aspects of the meeting to segregate and filter information that should not be displayed during the meeting to computers on a receiving end of screen sharing.

In some embodiments, the meeting management program 116 considers various inputs such as a user or group calendar feed, a meeting agenda, and/or identities of meeting participants to dynamically establish and enforce rules for information display privacy, for notification display privacy, and/or for distraction avoidance that are relevant for when arriving messages from any communication platform such as an instant messaging platform and/or via email are displayed and shown at a computer that is currently participating in a virtual meeting. Privacy rules may be applied to avoid confidential, trivial, and/or irrelevant information from being transmitted as a part of screen sharing. Distraction avoidance filters may be applied for screen sharing receiver computers and/or any computers participating in a virtual meeting. The distraction avoidance filters may temporarily block and/or delay incoming notifications and/or messages on a computer until a virtual meeting is finished. Distraction avoidance filters with respect to incoming messages and/or notifications may also be applied for any computer if the computer user has a full daily calendar or urgent tasks that are past or near a deadline.

The meeting management program 116 may invoke one or more techniques such as data storage, artificial intelligence such as optical character recognition, visual recognition, natural language processing, logic building, contextual understanding, relevancy scoring, and deep learning such as convolutional neural networks and recurrent neural networks, ranking and prioritization, push notifications, and predictive analytics to perform the meeting management and/or virtual meeting privacy management features described herein.

Figure 3:
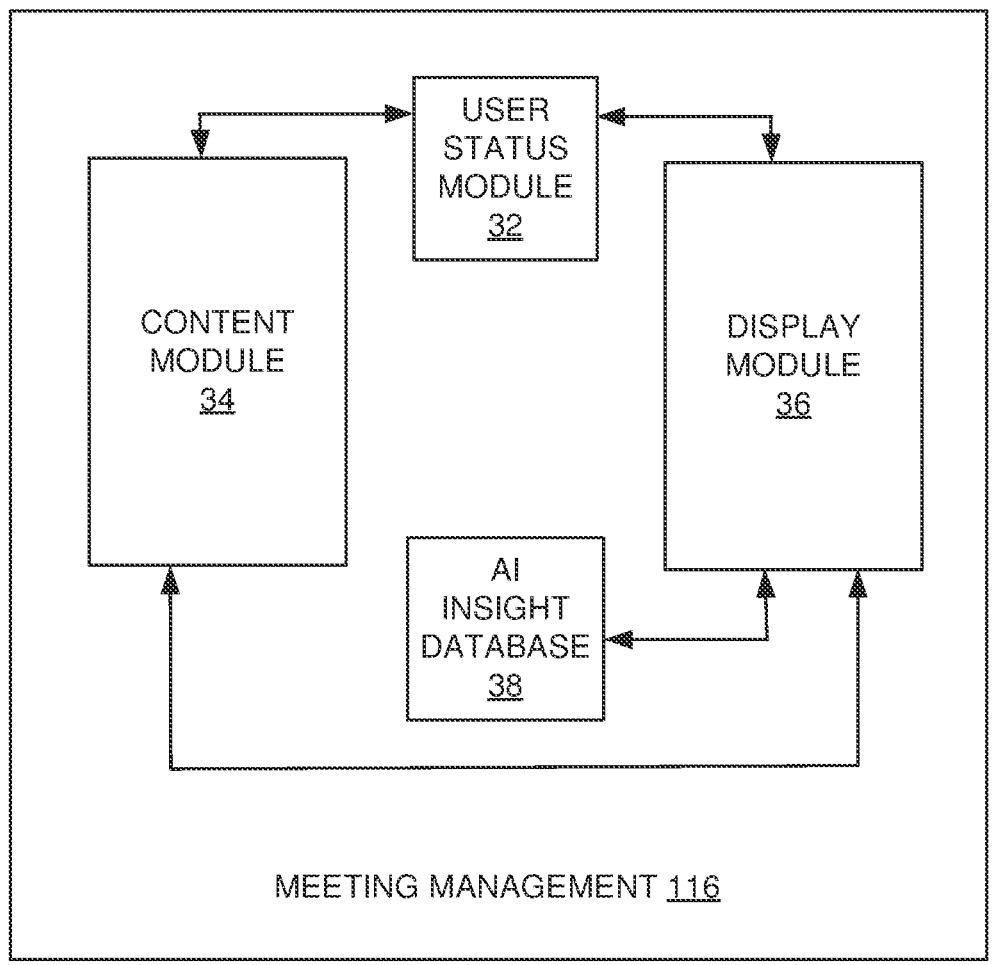
FIG. 3 illustrates details of a meeting management program according to at least one embodiment.

FIG. 3 illustrates details of a meeting management program 116 according to at least one embodiment. Specifically, the embodiment of the meeting management program 116 shown in FIG. 3 includes various modules and databases for performing various functions such as the privacy-related features described above. This embodiment of the meeting management program 116 includes a user status module 32, a content module 34, a display module 36, and an AI-insight database 38.

The meeting management program 116 may characterize computers seeking to communicate with other computers. The characterization may be based on a meeting role of a participant in a virtual meeting. The characterization may be based on a communication role for a party seeking to communicate with another party using the computers. One type of characterization is for a meeting role for a person/computer currently using their computer to screen share with one or more other computers as a part of a virtual meeting. Another type of characterization is for a meeting role for a person/computer designated as a current presenter for a virtual meeting. Another type of characterization is for a communication role for a person/computer trying to communicate with another person such as a presenter and/or person screen sharing their computer. Such communication attempt may occur through various communication platforms such as a social media communication platform. Characterizations may be fluid and change based on updated information received about current actions of the various computers/users. The meeting management program 116 may provide certain features and/or functions based on the characterization.

The user status module 32 of the meeting management program 116 may perform functions of (1) registering users who choose to participate with the meeting management program 116, (2) assigning the user type dynamically based on the functionality the user is performing, and (3) capturing the status of the user. The user status module 32 of the meeting management program 116 may transmit to and receive information/data from both the content module 34 and from the display module 36.

When a user wants to access and/or use the meeting management program 116, the user may perform some steps such as accessing a website, downloading software of the meeting management program 116 onto the used computer, and enter registration information into a website and/or software graphical portal via a displayed display screen and using input devices on the computer such as a mouse and/or keyboard. The meeting management program 116 may ask via a graphical user interface for user information such as name, email address, password, etc. The meeting management program 116 may assign a unique identifier for each user/registrant.

After registering, depending on the functionality that users are trying to perform the meeting management program 116 tries to identify the user type and assign a type to the user. These may include characterizations described above such as presenters in a virtual meeting and parties attempting to people who are participating in a virtual meeting such as a presenter/screen sharer in a virtual meeting.

In addition to identifying the user type, the meeting management program 116 may also attempt to identify the status of user. The meeting management program 116 may offer various user statuses such as "IsInMeeting", "IsSharingScreen", and "IsIdle".

When the user state for a potential presenter is "IsInMeeting", the user is in a meeting but not necessarily currently screen sharing for a meeting. When the user computer is providing a user status of "IsInMeeting", the computer may receive any type of notification including the notifications which are irrelevant to the subject of the meeting. However, if the user preferences are set to receive only contextual notifications while in meetings, the meeting management program 116 may analyze content of incoming messages and/or notifications and meeting content, generate a similarity score, and allow display of the messages and/or notifications if the similarity score exceeds a threshold.

When the user state for a potential presenter is "IsSharingScreen", the user is in a meeting and is sharing the display screen via transmitting the contents through the internet for receipt and display by other computers participating in the virtual meeting. When this type of user state is identified, the meeting management program 116 enables privacy features, some of which were described previously and some of which are described subsequently. The privacy features may include functions of disabling irrelevant notifications, showing only relevant notifications, blurring out the unnecessary content on screen, and, when content is blocked or blurred out, giving an option to user to decide what is relevant to the meeting for display and what is not relevant to the meeting for display.

When the user state for a potential presenter is "IsIdle", the user is not in a meeting and is not currently performing screen sharing of the contents of their screen. The user may be doing routine work tasks. When this state is identified, the meeting management program 116 may capture some compliant attributes to enable artificial intelligence-infused insights for the user. When user is idle, the meeting management program 116 may disable virtual meeting privacy features for screen sharing. Therefore, displayed content does not need to be currently analyzed by the meeting management program 116 which may save computing resources. Masking/blurring need not be performed. Distraction avoidance may nevertheless be implemented so that the meeting management program 116 blocks notifications if a calendar analysis reveals a long task list for the user with deadlines less than a predetermined time threshold. Alternatively, no notification blocking may be performed and the user may receive the usual display of notifications from other software applications on the user computer.

For a user account of the type that is trying to communicate with another user, the meeting management program 116 may offer various user states such as "IsInMeeting", "IsTryingToReachPresenter", and "IsIdle". The states "IsInMeeting" and "IsIdle" may be similar for the attempting communicator user type as they described above were for the potential presenter user type. The user state of "IsTryingToReachPresenter" may mean that the user is trying to reach someone who is presenting something in a virtual meeting. When recognizing this user state, the meeting management program 116 may begin to evaluate contents of messages to determine if the one or more messages are relevant to the virtual meeting content such as the discussed topics and digital content being presented. Based on a degree of relevancy, the content will be displayed and/or blocked/delayed on the computer of the user who is presenting. If the content is irrelevant, the content may be blocked during the virtual meeting or during the screen sharing portion of the virtual meeting. In some embodiments, the meeting management program 116 may also perform additional tasks such as generating and presenting an alert to the presenter computer if the content is not relevant to the virtual meeting content, recommending a channel of communication, and/or recommending a better time at which the presenter is available for receiving and possibly reading a message.

The content module 34 of the meeting management program 116 may perform functions of (1) gathering digital content for evaluation, (2) evaluating digital content, and (3) generating decisions about display of certain content based on the evaluation. The content module 34 of the meeting management program 116 may transmit to and receive information/data from both the user status module 32 and the display module 36.

The content module 34 may generate one or more graphical user interfaces to request and receive consent from the registering users. In this aspect the content module 34 gives a user flexibility to define what applications and their communication histories may be accessed by the meeting management program 116. Applications which the meeting management program 116 may access and ask for consent to access may include (1) social media platforms, (2) applications that generate push notifications and alerts such as browsers, calendars, reminders, and alarm applications, and (3) general applications such as code editors, terminals, and/or personal applications such as music/sticky notes etc. on the personal computer. Once the user defines the access and consent, the meeting management program 116 stores and registers the consent and registration data received. The content module 34 may allow retrieval of this stored data for use during other functions of the meeting management program 116. The meeting management program 116 will follow any applicable regional, national, international, etc. privacy compliance standards so that the users can be assured the system is compliant to a certain security standard and follows governance rules for the data that is being captured.

In some embodiments, one sub-module of the content module 32 is a screen content sub-module. The screen content sub-module may capture content displayed on a display screen of the computer of a program user. The screen content sub-module may also check the user type, state, access and consent data. If the user type is a presenter and the user state is IsSharingScreen, screen content sub-module may begin to capture some or all of the content displayed on the screen. The captured content may include various file formats such as .docx, .xlsx, .pptx, .mp3, and .mp4 file formats (or the equivalent, presently existing or after-arising). The screen content sub-module may perform text analysis with natural language processing and may perform optical character recognition of images displayed with text images. For a user type that is an attempting communicator, the screen content sub-module may capture the content of a message that is intended to be transmitted to another user computer. Various file formats such as those mentioned above may also be accessed by the screen content sub-module for this user type. Capture data may be stored in data storage that is part of or accessible to the meeting management program 116. This captured content may relate to content of a virtual meeting.

Once the content is captured, the content module 32 may perform various techniques for some embodiments to understand and analyze the captured content. To extract the text from images from slides, the content module may perform optical character recognition. Visual recognition may be performed on images. Video may be submitted to a convoluted neural network and/or to a recurrent neural network to extract each frame of image. From an extracted individual frame, the frame may be submitted to another recurrent neural network to extract the image meaning.

The content module 32 may similarly capture and extract content from incoming messages and/or notifications from applications to which the user has given access to the meeting management program 116. Notifications displayed or to be displayed on the screen are captured. The notifications may include, for example, alerts, reminders, alarms, push notifications, and messages from other users from social media platforms.

The content module 32 may compare the meeting content with the incoming content. The comparison may be performed using natural language processing, text summarization, word cloud, semantic similarity vector comparisons, etc. to understand the similarity of the incoming messages to the meeting content. The content module 32 may perform logic building among various texts captured to understand the meaning within the content. Using these and similar techniques, the content module 32 may develop a contextual understanding of captured content, may understand the correlation between the captured content of meeting and incoming messages, and may assign a relevancy score for the compared content.

Similarly, the correlation is calculated for every content displayed in a virtual meeting so that each incoming message or notification receives a relevancy score. A score threshold may be set in the content module 32. If the relevancy score matches or exceeds the pre-defined limit, then the incoming message or notification may be further passed for display on the screen of the user computer or to the display module 36 which may further decide about actual display on the display screen.

If the user is attempting to send a message to someone who is in a virtual meeting, the content of the hoped-for message is analyzed and a relevancy score of the hoped-for message to the meeting content is similarly determined. If the relevancy score matches or exceeds a pre-defined threshold, the message may be sent to the display module 36 in the computer of the attempted recipient. If the relevancy score is less than the pre-defined threshold, the user may be notified that the intended recipient is currently unavailable.

Thus, the content module 32 performs multiple functions such as capturing content, performing operations on the content, generating relevancy scores, and comparing to relevancy thresholds to determine which messages are sent to the display module 36.

The display module 36 of the meeting management program 116 may perform functions of (1) generating responses, (2) displaying the responses on display screens of the computers, and (3) performing a generated response plan on one or more computer applications. The display module 36 may transmit messages and data to the user status module 32, to the content module 34, to the AI-insight database 38 and to external applications. The display module 36 may receive transmissions of messages and/or data from the user status module 32, the content module 34, the AI-insight database 38, and the external applications. The display module 36 may retrieve the access and permissions for every application involved. Depending on the application involved, on the user type, and on the user state, a course of action will be generated in the display module 36.

For example, if the user type of a participating user is presenter and the state is "IsSharingScreen", the fetched relevancy scores are confirmed as being above the pre-defined limit, then the application type is checked. If the operation is to display a message, alert, and/or a notification, then the message, alert, and/or notification may be displayed on the computer screen in the form with which the message, alert, and/or notification was received. If the application type is a code editor, a terminal, etc., then the display module 32 generates a course of action referred to as a response plan. The response plan may include masking the data or blurring out certain parts of data on the applications involved like code editors/terminals etc. The display module 32 may include sub-modules of generating response content and generating a response plan.

If the user type is for a party attempting to communicate, the user state is "IsTryingToReachPresenter", and the relevancy scores retrieved are above the predefined limit, the display module 32 will generate the response plan accordingly. This response plan may include displaying the message. If the relevancy score is not above the limit, a response message will be generated by the sub-module for generating response content that indicates unavailability of the intended recipient.

Based on the decided action, the display module 32 will show the response message to the different users using the sub-module for displaying a generated message. If the response plan is for using an external application such as a code editor or a terminal, the specified actions in the generated plan may be performed using a performing the course of action sub-module.

If multiple applications are involved, the display module 36 may also be responsible for prioritizing and ranking the course of actions and accordingly decide which should be performed first so that the user is not affected. At a given point in time, this display module 36 will decide which operation is crucial and accordingly prioritize. Thus, the display module 36 is responsible for generating message content, generating response plans, prioritizing the plans that are generated, and performing the response plans on the applications with access and permissions for all the users involved.

The AI insight database 38 may store output from artificial intelligence accessed by the meeting management program 116. Using artificial intelligence may result in an enhanced user experience of the meeting management program 116. The AI insight database 38 may access artificial intelligence such as a machine learning model that is stored elsewhere in the same computer such as the client computer 101 or in a remote server 104. Data may be captured from various application integrations because applications may generate notifications.

Due to some application access and communication history access being provided by the user to a wide range of applications, multiple attributes for the user and their communication patterns can be collected, analyzed, and modelled to provide some capabilities to the user. Such attributes may include time spent by the user on an individual application, a number of times each application is opened and closed, times of day at which the applications are used for longer duration, and/or types of information shared on types of platforms. Because some content is already being captured with respect to meetings and notifications, etc., that captured content will also be used in data modelling with the artificial intelligence. Individual blocks can be made for each attribute in the data storage of the AI insight database 38.

With the attributes collected, data models are created using artificial intelligence models and predictive analytics. The data models are specific to communication tendencies of a user. The insights/capabilities may include the recommendation of a best communication platform based on the context of message and the type of message being shared. The insights may further include a recommend time of day and/or particular day of the week the receiver might be available to read the message and respond to the message. Such timing recommendation may be based on the context of message, the type of message, the calendar of the receiver, and the tasks of the receiver from the project management tools. In cases of platform outages/updates etc., the meeting management program 116 may perform a cross platform search and understand the user availability and may recommend a replacement platform for communication if one platform is experiencing an outage. The meeting management program 116 may understand user behavioral patterns from the communication history data, may define a user fingerprint to understand a mood of the user at a specific point in time based on the current conditions, and based on the mood may recommend a type of content and message content modifications for users trying to communicate with the first user. Other patterns may be recognized such as user-consented message/alert/notification snoozing for some repeated patterns where the user repeated this task on multiple occasions.

The display module 36 may communicate with external applications that are being monitored by the meeting management program 116 to perform a specific action on them. These software applications/programs could be in a variety of forms such as social media applications, enterprise communication applications, and/or any software that is installed on a personal computer such as code editors and terminals.

It may be appreciated that FIG. 3 provides an illustration of some embodiments and does not imply any limitations with regard to how different embodiments may be implemented. Many modifications to the depicted embodiment(s), e.g., to a depicted formulation of modules or communication exchange between modules, may be made based on design and implementation requirements. Steps and features from the various processes may be combined into the other processes that are described in other drawings or embodiments.

In some embodiments, the meeting management program 116 may further include a computer-implemented method for generating a communication mode suggestion. The method may include steps of receiving, via a first computer, a communication request from a first user to communicate with a second user; inputting, via the first computer, the received communication request to a first machine learning model, the first machine learning model having been trained with historical usage of the second user for communication responses across multiple communication platforms, wherein the first machine learning model generates the communication mode suggestion in response to receiving the received communication request as an input; and transmitting, via the first computer, the communication mode suggestion for presentation to the first user.

In further embodiments, the communication mode suggestion includes a best platform amongst the multiple communication platforms for the first user to communicate with the second user. The best platform is selected from a group consisting of e-mail, a first instant messaging program, a telephone call, a paper message, and an in-person visit. An outage check of the best platform may be performed by a computer to confirm availability of the best platform before transmitting the communication mode suggestion to the first user. In response to the outage check finding the best platform is experiencing an outage, the first machine learning model generates an alternative preferred platform from the multiple communication platforms for the first user to communicate with the second user and wherein the alternative preferred platform is transmitted to the first user as part of the communication mode suggestion.

In some embodiments, the machine learning model for communication mode suggestions further generates an estimated response time for the first user to receive a response from the second user in response to the first user communicating with the second user according to the communication mode suggestion. The communication mode suggestion may comprise a recommended time for the first user to send a communication to the second user. The communication mode suggestion may further comprise a best platform amongst the multiple communication platforms for the first user to communicate with the second user.

In some embodiments, the communication request comprises a current day and time and the first machine learning model uses the current day and time to generate the communication mode suggestion. The communication request may further comprise a time zone of the first user, and wherein the first machine learning model was further trained on historical time zones of the second user. The first machine learning model may have been further trained on daily calendars of the second user and finds relationships of the daily calendars to the historical usage of the first user for the communication responses across the multiple communication platforms. A present daily calendar of the second user may be input into the first machine learning model to help generate the communication mode suggestion. The daily calendars may include work tasks for the second user.

In some embodiments, the communication request comprises a content type of desired communication for the first user to communicate to the second user, and wherein the communication mode suggestion is further based on the content type. In some embodiments, the communication request comprises intended message content for desired communication for the first user to communicate to the second user. In response to the received communication request being input into the first machine learning model, the first machine learning model further provides content modification suggestions for the intended message content, the content modification suggestions being based on the historical usages of the second user; and the communication mode suggestion that is transmitted to the first user comprises the content modification suggestions.

In some embodiments, a work role of the first user is input into the machine learning model for communication mode suggestions along with the received communication request, and the communication mode suggestion is further based on the work role of the first user. The machine learning model may be further trained on a work role of the second user and the communication mode suggestion may be further based on a comparison of the work role of the first user to the work role of the second user.

In some embodiments, the communication mode suggestion may indicate that no response would be expected for a particular time interval. Such indication may be provided if current party data retrieved by the meeting management program 116 indicates that the desired party is out of the office, swamped with urgent tasks, etc.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for automated management of a meeting, the method comprising:

receiving, via a first computer, a meeting agenda for a first meeting that is occurring at least in part as a virtual meeting;

accessing, via the first computer, live content from the first meeting, wherein the live content includes at least one of audio and text transmitted for the virtual meeting;

generating, via the first computer, an avatar and a recommended interaction frequency for a user to interact with the first meeting, wherein the generating is based on the meeting agenda and on the accessed live content and comprises inputting the meeting agenda and the accessed live content into a machine learning model and, in response to the inputting, the machine learning model outputting the recommended interaction frequency, wherein the machine learning model performs natural language processing on the at least one of the audio and text to produce the recommended interaction frequency; and presenting, via a display screen of the first computer, the avatar providing the recommended interaction frequency, the recommended interaction frequency comprising an indication of a specified time interval in which the user should provide, via the first computer, an interaction with the first meeting.

2. The method of claim 1, wherein the machine learning model further outputs a summary of a first part of the first meeting in response to the inputting, and wherein the summary is presented via the avatar on the display screen of the first computer.

3. The method of claim 1, wherein the machine learning model analyzes the accessed live content to determine meeting participation in the first meeting, and wherein the recommended frequency interaction is based on the determined meeting participation.

4. The method of claim 1, wherein the user is a late-arriving party to the first meeting.

5. The method of claim 1, wherein in response to the inputting the machine learning model further outputs a meeting suggestion that relates to a second meeting that is subsequent to the first meeting.

6. The method of claim 5, wherein the meeting suggestion comprises a missed agenda point that was not discussed in the first meeting.

7. The method of claim 6, wherein the missed agenda point is presented via the display screen in response to a similarity score of the second meeting with respect to the first meeting exceeding a pre-determined threshold.

8. The method of claim 5, wherein the meeting suggestion comprises one or more preparation tasks to perform in advance of the second meeting.

9. The method of claim 8, wherein a timing of a presentation on the display screen of the one or more preparation tasks is based on an estimated time amount needed to complete the one or more preparation tasks.

10. The method of claim 8, wherein a timing of a presentation on the display screen of the one or more preparation tasks is based on a user profile setting.

11. The method of claim 5, wherein the meeting suggestion relates to an action item that was established in the first meeting.

12. The method of claim 1, wherein in response to the inputting the machine learning model further outputs a missed agenda point that has not yet been discussed in the first meeting, and the missed agenda point is presented via the display screen before an end of the first meeting.

13. The method of claim 1, further comprising performing, via the first computer, an automatic retrieval of digital content, wherein the digital content is selected based on the meeting agenda and on the accessed live content.

14. The method of claim 1, wherein the machine learning model further performs natural language processing on the meeting agenda in order to generate the recommended interaction frequency.

15. A computer system for automated management of a meeting, the computer system comprising:
   one or more processors, one or more computer-readable memories, a display screen, and program instructions stored on at least one of the one or more computer-readable memories for execution by at least one of the one or more processors to cause the computer system to:
      receive a meeting agenda for a first meeting that is occurring at least in part as a virtual meeting;
      access live content from the first meeting, wherein the live content includes at least one of audio and text transmitted for the virtual meeting;
      generate an avatar and a recommended interaction frequency for a user to interact with the first meeting, wherein the generating is based on the meeting agenda and on the accessed live content and comprises inputting the meeting agenda and the accessed live content into a machine learning model and, in response to the inputting, the machine learning model outputting the recommended interaction frequency, wherein the machine learning model performs natural language processing on the at least one of the audio and text to produce the recommended interaction frequency; and
      present, via the display screen, the avatar providing the recommended interaction frequency, the recommended interaction frequency comprising an indication of a specified time interval in which the user should provide, via the computer system, an interaction with the first meeting.

16. A computer program product for automated management of a meeting, the computer program product comprising a computer-readable storage medium having program instructions embodied therewith, the program instructions executable by a computer to cause the computer to:
   receive a meeting agenda for a first meeting that is occurring at least in part as a virtual meeting;
   access live content from the first meeting, wherein the live content includes at least one of audio and text transmitted for the virtual meeting;
   generate an avatar and a recommended interaction frequency for a user to interact with the first meeting, wherein the generating is based on the meeting agenda and on the accessed live content and comprises inputting the meeting agenda and the accessed live content into a machine learning model and, in response to the inputting, the machine learning model outputting the recommended interaction frequency, wherein the machine learning model performs natural language processing on the at least one of the audio and text to produce the recommended interaction frequency; and
   present, via a display screen of the computer, the avatar providing the recommended interaction frequency, the recommended interaction frequency comprising an indication of a specified time interval in which the user should provide, via the first computer, an interaction with the first meeting.

17. The method of claim 1, wherein the avatar is generated according to a theme that matches one or more meeting points as indicated in at least one of the meeting agenda and the live content.

18. The method of claim 1, wherein the avatar includes a persona that copies a real-life persona of a presenter of the first meeting.

19. The method of claim 18, wherein the persona comprises a cartoon form that mimics captured one or more images of the presenter.

20. The method of claim 1, wherein the avatar presents the recommended interaction frequency via at least one of:
   audio that is played via a speaker of the first computer to correspond to a visual image of the avatar speaking; and
   text that is displayed in a text bubble as a visual image on the display screen.

* * * * *